United States Patent [19]
Yap

[11] Patent Number: 5,389,435
[45] Date of Patent: Feb. 14, 1995

[54] FLAME RETARDANT EPOXY COMPOSITE

[75] Inventor: Hugh A. Yap, Marysville, Wash.

[73] Assignee: ICI Composites Inc., Tempe, Ariz.

[21] Appl. No.: 64,619

[22] Filed: May 20, 1993

Related U.S. Application Data

[63] Continuation-in-part of Ser. No. 797,527, Nov. 25, 1991, abandoned.

[51] Int. Cl.6 .................. B32B 5/16; B32B 9/00; B32B 27/38
[52] U.S. Cl. .................. 428/324; 428/328; 428/331; 428/408; 428/412; 428/413; 428/446; 428/920; 428/921; 428/702; 523/457; 523/416
[58] Field of Search .............. 428/408, 324, 412, 331, 428/413, 328, 446, 921, 920, 702; 523/457, 416

[56] References Cited

U.S. PATENT DOCUMENTS

| | | |
|---|---|---|
| 4,212,920 | 7/1980 | Seamans . |
| 4,283,521 | 8/1981 | Jones . |
| 4,647,500 | 3/1987 | George et al. . |
| 4,778,722 | 10/1988 | Yamamura et al. . |
| 4,956,217 | 9/1990 | Heitkamp . |

FOREIGN PATENT DOCUMENTS 281226   9/1986   European Pat. Off. .

*Primary Examiner*—P. C. Sluby
*Attorney, Agent, or Firm*—J. M. Sheehan

[57] ABSTRACT

The present invention is a flame retardant composite material comprising a laminate of (A) a glass scrim coated with an inorganic filler and an epoxy resin and (B) a structural composite of graphite fibers and an epoxy resin.

7 Claims, No Drawings

FLAME RETARDANT EPOXY COMPOSITE

This is a continuation in part of copending application Ser. No. 07/797,527, filed on Nov. 25, 1991, now abandoned.

BACKGROUND OF THE INVENTION

Toughened epoxy resin composites have been suggested for use in structural applications where materials such as aluminum were previously employed.

A problem in the use of structural composites based on organic polymers, is that some organic polymers, particularly epoxies, are suspect as hazards due to their flammability properties when exposed to fire and/or heat. This hazard is particularly noted when such an organic polymer based composite is used in an aircraft environment. The U.S. Government has promulgated standards which are required of materials that may be used in the aircraft industry. Many of the polymer materials cannot pass the government standard and, unless made more flame retardant, can not be approved for use in aircraft.

A U.S. Government standard for flammability resistance is set out in FAR 25,853 et seq. (14 CFR Ch 1) and are incorporated herein by reference. Three of the standard tests described in Appendix F to FAR 25.583 and 25.855 require a twelve and a sixty second vertical burn and a thirty second 45 degree angle burn. In these tests, the flame, usually a bunsen burner type flame, impinges on the material. To pass the sixty second vertical burn test the material after a sixty second flame application, if ignited must self-extinguish within fifteen seconds, the average vertical burn length must not exceed approximately 15.2 centimeters, and the average melt drip extinguishing time must be less than or equal to three seconds. This means that the material must put itself out, that the flame must not spread throughout the material and that the material cannot be a source of fire spread to other areas.

Epoxy resin materials are known for their bonding properties. Epoxy materials, however, have been limited in applicability due to the hazard presented because of their flammability and/or smoke generating properties.

SUMMARY OF THE INVENTION

In accordance with the present invention, the flame retardant properties of an epoxy resin based structural composite are improved by laminating to the surface of such composite a light weight glass scrim coated with a composition comprising (a) an inorganic filler and (b) an epoxy resin.

DETAILED DESCRIPTION OF THE INVENTION

The epoxy resin based structural composites used in the present invention include any of these known in the art. These composites comprise a graphite fiber in addition to an epoxy resin. Examples of such structural composites are those prepared from the 977 series of toughened epoxies from ICI Composites Inc. and the 3900 series of toughened epoxies from Toray. The structural composites are preferably used as a prepreg,—i.e., a partially cured fiber and resin material. The structural compopsite may be in the form of a fabric or tape.

The epoxy resin used in the structural composite may be any of those which are conventionally employed in composite structures. These include epoxies derived from bisphenol A, bisphenol E, bisphenol F, bisphenol S, the halogen substituted bisphenol resins, novalacs, aliphatic epoxies and combinations thereof. The epoxy resin may be toughened by incorporating into the resin any of the known toughening agents. Suitable toughening agents are elastomers, core/shell particles, rubber, and thermoplastic polymers such as the ketones, sulfones, esters, imides, amides and copolymers thereof. In particular, the toughening agents found useful are polyethersulfone (i.e. Victrex 5003P PES), polyetherethersulfone, polyarylethersulfone, polyetheretherketone, and polyetherketone. Graphite fibers are added to the polymers as strength additives.

In the present invention the flame retardant properties of the epoxy resin based structural composite can be improved by laminating to the surface of the composite a glass scrim coated with a composition comprising (a) an inorganic filler and (b) an epoxy resin.

Inorganic fillers which may be used include inorganic oxides and inorganic salts. These include silicates, zirconates, aluminates, titanates, alkalates, alkaline earth oxides, the rare earth metal oxides, transition metal oxides, minerals made therefrom, and combinations thereof. Preferred inorganic fillers are silicates, such as magnesium silicate, potassium aluminum silicate, sodium aluminum silicate, magnesium aluminum silicate, and combinations thereof. The most preferred inorganic fillers are the class of minerals comprised of layered minerals including the micas, especially white Muscovite mica.

Any epoxy resin may be used in the composition used to coat the glass scrim. Most preferable are those derived from bisphenol A, bisphenol E, bisphenol F, bisphenol S, and the halogen substituted bisphenol resins, novalacs, aliphatic epoxies, and combinations thereof.

The inorganic filler is combined with the epoxy resin in a mixer and admixed to produce an inorganic oxide filled epoxy resin composition. The composition may comprise layers of the inorganic oxide on an epoxy coated fabric or be heterogeneously admixed which provides a flame retardant benefit. Most preferably, the inorganic oxide is substantially homogeneously dispersed throughout the epoxy resin composition. The amount of inorganic filler employed in the composition may range from about 1 to about 99% by weight based on the total weight of the composition. Preferred results are achieved with from about 5 to about 75 percent by weight filler. Most preferably, from about 10 to about 30 percent by weight filler may be used.

The inorganic filler—epoxy composition may be diluted with a suitable solvent such as methyethylketone. The resulting composition is then used as a dip coating for a glass scrim. The coated glass scrim is heated to drive off the solvent and to partially cure the epoxy resin.

The laminates of the present invention are prepared by combining the structural composite with the coated glass scrim. This may be done by pressing, vacuum forming, autoclaving, vacuum bagging or other techniques known in the art for preparing composite laminates. It is preferred to combine the materials as prepregs—i.e., partially cured—layers. After being combined the materials are pressed together and cured simultaneously. Alternatively, the structural composite may be cured first and the coated glass scrim bonded to the surface of the cured composite and the scrim subsequently cured.

If more than one surface of the structural composite may be exposed to flames then both surfaces may be laminated to the coated glass scrim. In the case of a three dimensional structure all of the exterior surface may be laminated with the coated glass scrim.

The laminates of the present invention are most advantageous in the aircraft field of art. However, in any of the transportation and/or structural fields of art and-/or vehicles where light weight flame retardant materials are needed, the present invention will provide advantages heretofore unknown. This is particularly pertinent in primary structural aerospace applications where flame retardancy is required in the interior and some of the exterior of the airplane. An example of one of these applications are floor beams. In particular, the marine, automobile, and rail means of transportation will be advantaged by the invention disclosed herein.

The following examples are provided to further illustrate the invention and are not intended to limit the scope of the invention.

In the examples, the following materials and test procedures were used:

EPOTUF 98-411 is an epoxy resin obtained from Sansum of Torrance, Calif.

EPON-828 is an epoxy resin obtained from Shell.

CP 707 is a 50:50 blend of EPON 828 and antimony trioxide obtained from Shell.

KELPOXY G 272 is a 60:40 blend of EPON 828 and CTBN which is a 3-carboxy-1-cyano-1-methyl propyl terminated polymer of 2-propenenitrile with 1,3-butadiene obtained from Reichhold of Buffalo, N.Y.

HYCAR 1472 is a carboxy terminated polymer of 2-propenenitrile with 1,3-butadiene obtained from B. F. Goodrich.

DICYANIMIDE CA 1200 is cyanoguanidine obtained from Omicron of Morristown, N.J.

DIURON Grade 3 is 3-(dichlorophenyl)-1,1-dimethyl urea from DuPont.

ANCAMINE K61B is an amine salt, specifically tris (dimethylaminomethyl) phenol.tri (2 ethyl hexoate) from Pacific Anchor of Bethlehem, Pa.

Toray 3900 is a thermoplastic toughened epoxy prepreg sold for primary structural aerospace applications.

The sixty second vertical flame test was conducted as described in Appendix F to FAR 25.853 (14 CFR Ch. 1).

EXAMPLE 1

An inorganic filler/epoxy resin composition was prepared from 27.82 weight percent Epotuf 98-411, 3.36 weight percent CP-707, 20.94 weight percent Epon 828, 7.29 weight percent Kelpoxy G-272, 1.25 weight percent Hycar 1472, 8.42 weight percent tetrabromo bisphenol A, 23 weight percent white Muscovite mica and 2.0 weight percent fumed silica. The ingredients were combined with methylethylketone. The composition included, as curing agents 12.81 weight percent Dicyanimide CG 1200, 2.81 weight percent Diuron Grade 3 and 0.30 weight percent Anacamine K61B. The composition was mixed with an air mixer to a uniform mixture and impregnated onto and in a style 108 glass scrim. The solvent was substantially removed by heating to form a partially cured prepreg. The resultant prepreg had a resin content of about 50 weight percent and a volatile content of about 1 weight percent maximum. The prepreg was co-cured on Toray 3900 prepreg for 3 hours at 177 degrees centigrade in an autoclave. The resultant cured sample exhibited the property values shown in the Table below, during the sixty second vertical flame test.

EXAMPLE 2

Example 2 was the same as Example 1 except that, after co-curing as described in Example 1, a second step was added for secondarily curing and bonding the coated glass scrim to the laminate derived from Toray 3900 prepreg. This step involved curing the combination at 127 degrees centigrade for 1 hour under 50 psi pressure in an autoclave. The resultant sample exhibited the property values shown in the Table below during the sixty second vertical flame test.

TABLE

|  | Toray 3900 Laminate Alone | Example 1 | Example 2 |
| --- | --- | --- | --- |
| self extinguishing time (in seconds) | 14–16 | 4.5 | 5.2 |
| Ave. burn length (in centimeters) | less than 15.2 | less than 15.2 | less than 15.2 |
| Ave. drip extinguishing time (in seconds) | 0 | 0 | 0 |

What is claimed is:

1. A laminate comprising
   A. a glass scrim coated with a composition comprising an inorganic filler selected from the group consisting of inorganic oxides and salts and a first epoxy resin and
   B. a structural composite comprising graphite fibers and a second epoxy resin.

2. A laminate, as claimed in claim 1, wherein the first epoxy resin is selected from the group consisting of epoxy resins derived from bisphenol A, bisphenol E, bisphenol F or bisphenol S, halogen substituted bisphenol resins, novalacs and aliphatic epoxies.

3. A laminate, as claimed in claim 1, wherein the inorganic filler is selected from the group consisting of mica, white Muscovite mica, silicates, zirconates, aluminates, titanates, alkalates, alkaline earth oxides, rare earth metal oxides, transition metal oxides, magnesium silicate, potassium aluminum silicate, sodium aluminum silicate, and magnesium aluminum silicate.

4. A laminate, as claimed in claim 1, wherein the second epoxy resin is selected from the group consisting of epoxy resins derived from bisphenol A, bisphenol E, bisphenol F or bisphenol S, halogen substituted bisphenol resins, novalacs, and aliphatic epoxies.

5. A laminate, as claimed in claim 1, wherein the first epoxy resin and the second epoxy resin are the same material.

6. A laminate, as claimed in claim 1, wherein the inorganic filler is white Muscovite mica.

7. A laminate comprising
   A. a first glass scrim coated with a composition comprising an inorganic filler selected from the group consisting of inorganic oxides and salts and a first epoxy resin laminated to
   B. a first surface of a structural composite comprising graphite fibers and a second epoxy resin and
   C. a second glass scrim coated with a composition comprising an inorganic filler selected from the group consisting of inorganic oxides and salts and a first epoxy resin laminated to a second surface of the structural composite.

* * * * *